US011431558B2

(12) United States Patent
Pérez-Aradros Herce et al.

(10) Patent No.: US 11,431,558 B2
(45) Date of Patent: Aug. 30, 2022

(54) DATA SHIPPER AGENT MANAGEMENT AND CONFIGURATION SYSTEMS AND METHODS (71) Applicant: Elasticsearch B.V., Mountain View, CA (US)

(72) Inventors: Carlos Pérez-Aradros Herce, Logroño (ES); Pier-Hugues Pellerin, Montreal (CA)

(73) Assignee: Elasticsearch B.V., Amsterdam (NL)

( * ) Notice: Subject to any disclaimer, the term of this patent is extended or adjusted under 35 U.S.C. 154(b) by 0 days.

(21) Appl. No.: 16/379,356

(22) Filed: Apr. 9, 2019

(65) Prior Publication Data
US 2020/0328936 A1 Oct. 15, 2020

(51) Int. Cl.
*H04L 41/08* (2022.01)
*H04L 43/04* (2022.01)
(Continued)

(52) U.S. Cl.
CPC .............. *H04L 41/08* (2013.01); *G06F 9/547* (2013.01); *H04L 41/22* (2013.01); *H04L 43/04* (2013.01)

(58) Field of Classification Search
CPC ....... H04L 41/04; H04L 41/069; H04L 41/08; H04L 41/22; H04L 41/5054; H04L 41/5077; H04L 43/045; H04L 43/08; H04L 43/16; H04L 5/0055; H04L 5/0053; H04L 43/04; H04W 74/0833; H04W 76/27;
(Continued)

(56) References Cited

U.S. PATENT DOCUMENTS 6,519,597 B1 2/2003 Cheng et al.
7,945,533 B2 5/2011 Krishnaprasad et al.
(Continued)

FOREIGN PATENT DOCUMENTS

CN 106528797 A 3/2017
CN 106934062 A 7/2017
(Continued)

OTHER PUBLICATIONS

"International Search Report" and "Written Opinion of the International Searching Authority," Patent Cooperation Treaty Application No. PCT/US2019/063437, dated Feb. 7, 2020, 8 pages.
(Continued)

Primary Examiner — Jonathan A Bui
Assistant Examiner — Zonghua Du
(74) Attorney, Agent, or Firm — Carr & Ferrell LLP (57) ABSTRACT Data shipper agent management and configuration systems and methods are disclosed herein. In some embodiments, an example method includes enrolling data shipper agents which are installed on edge nodes, receiving selections of one or more tags for the data shipper agents, each of the one or more tags representing one or more services assigned to the data shipper agents, configurations of the services being modifiable through the one or more GUIs using a configuration application programming interface (API), providing the one or more GUIs, receiving configurations for at least one of the modules of one of the data shipper agents through one of the one or more GUIs, and automatically reconfiguring the configurations to other ones of the data shipper agents automatically.

20 Claims, 8 Drawing Sheets (51) Int. Cl.
*H04L 41/22* (2022.01)
*G06F 9/54* (2006.01)

(58) Field of Classification Search
CPC ............ H04W 72/042; H04W 72/0446; G06F 11/3476; G06F 11/2094; G06F 11/3006; G06F 9/44526; G06F 9/547; G06F 21/316; G06F 21/552; G06F 8/61; G06F 3/06; G06F 3/065; G06F 16/27; G06F 16/22

See application file for complete search history.

(56) References Cited

U.S. PATENT DOCUMENTS

| | | | |
|---|---|---|---|
| 8,352,519 | B2 | 1/2013 | Nath |
| 8,615,794 | B1* | 12/2013 | Tomilson .......... H04W 12/0804 726/6 |
| 8,898,261 | B1* | 11/2014 | Patsenker ............ H04L 41/046 709/213 |
| 8,930,332 | B2 | 1/2015 | Burstein |
| 9,015,301 | B2 | 4/2015 | Redlich et al. |
| 9,734,180 | B1 | 8/2017 | Graham et al. |
| 10,541,983 | B1 | 1/2020 | Khashei Varnamkhasti et al. |
| 10,891,165 | B2 | 1/2021 | Willnauer |
| 10,997,204 | B2 | 5/2021 | Leskes |
| 11,182,093 | B2 | 11/2021 | Leskes |
| 11,188,531 | B2 | 11/2021 | Leau |
| 2005/0004892 | A1 | 1/2005 | Brundage et al. |
| 2005/0114397 | A1* | 5/2005 | Doshi ..................... H04L 41/00 |
| 2006/0075079 | A1* | 4/2006 | Powers ................. G06F 9/5072 709/220 |
| 2009/0276215 | A1 | 11/2009 | Hager |
| 2010/0174677 | A1* | 7/2010 | Zahavi .................... G16Z 99/00 707/694 |
| 2010/0179940 | A1 | 7/2010 | Gilder |
| 2011/0134764 | A1* | 6/2011 | Venkatapadmanaabhan ............... H04L 41/0873 370/252 |
| 2011/0282839 | A1 | 11/2011 | Paksoy et al. |
| 2012/0233118 | A1 | 9/2012 | Holt et al. |
| 2012/0233299 | A1* | 9/2012 | Attanasio .............. H04L 41/046 709/220 |
| 2013/0086039 | A1 | 4/2013 | Saleh et al. |
| 2013/0297469 | A1* | 11/2013 | Spittle .................... G06Q 10/10 705/35 |
| 2014/0012814 | A1 | 1/2014 | Bercovici et al. |
| 2014/0157224 | A1 | 6/2014 | Capuozzo et al. |
| 2014/0279871 | A1 | 9/2014 | Ochoa et al. |
| 2014/0330785 | A1 | 11/2014 | Isherwood et al. |
| 2015/0280999 | A1* | 10/2015 | Chart ...................... H04L 41/04 709/224 |
| 2015/0293955 | A1* | 10/2015 | Dickey ................. G06F 16/245 707/741 |
| 2015/0379083 | A1 | 12/2015 | Lang et al. |
| 2016/0085839 | A1 | 3/2016 | D'Halluin et al. |
| 2016/0127517 | A1 | 5/2016 | Shcherbakov |
| 2016/0191509 | A1 | 6/2016 | Bestler et al. |
| 2016/0203168 | A1 | 7/2016 | Gangadharappa |
| 2016/0203174 | A1 | 7/2016 | Shahane et al. |
| 2016/0224600 | A1 | 8/2016 | Munk |
| 2016/0292171 | A1 | 10/2016 | Bhagat et al. |
| 2017/0024453 | A1 | 1/2017 | Raja et al. |
| 2017/0078167 | A1 | 3/2017 | Bansal |
| 2017/0093640 | A1 | 3/2017 | Subramanian et al. |
| 2017/0124151 | A1 | 5/2017 | Ji et al. |
| 2017/0193041 | A1 | 7/2017 | Fuchs |
| 2017/0371926 | A1 | 12/2017 | Shiran et al. |
| 2018/0189328 | A1 | 7/2018 | Frazier et al. |
| 2018/0268000 | A1 | 9/2018 | McManus et al. |
| 2019/0026336 | A1 | 1/2019 | Tian |
| 2019/0124105 | A1 | 4/2019 | Chauhan |
| 2019/0266271 | A1 | 8/2019 | Leau |
| 2020/0050612 | A1 | 2/2020 | Bhattacharjee et al. |
| 2020/0084213 | A1 | 3/2020 | Taropa |
| 2020/0133550 | A1 | 4/2020 | Willnauer |
| 2020/0176098 | A1 | 6/2020 | Lucas et al. |
| 2020/0201879 | A1 | 6/2020 | Leskes |
| 2020/0233692 | A1* | 7/2020 | Kan ....................... H04L 67/34 |
| 2020/0326986 | A1 | 10/2020 | Willnauer |
| 2020/0348878 | A1 | 11/2020 | Leskes |
| 2021/0015263 | A1 | 1/2021 | Lah |
| 2021/0124620 | A1 | 4/2021 | Willnauer |
| 2021/0126977 | A1 | 4/2021 | Ruflin et al. |
| 2021/0240731 | A1 | 8/2021 | Leskes |
| 2022/0035555 | A1 | 2/2022 | Leskes |
| 2022/0050844 | A1 | 2/2022 | Leau |
| 2022/0075646 | A1 | 3/2022 | Landau et al. |

FOREIGN PATENT DOCUMENTS

| | | |
|---|---|---|
| EP | 3899710 A1 | 10/2021 |
| GB | 2592130 A | 8/2021 |
| WO | WO2020131330 A1 | 6/2020 |

OTHER PUBLICATIONS

Tedor, Jason, "Introduce Cross-Cluster Replication"; GitHub [online], Sep. 5, 2017 [retrieved Jan. 24, 2020], retrieved from the Internet: <https://github.com/elastic/elasticsearch/issues/30086>, 9 pages.
Willnauer, Daniel, "Shard Splitting," U.S. Appl. No. 16/176,956, filed Oct. 31, 2018, Specification, Claims, Abstract, and Drawings, 47 pages.
Willnauer, Simon Daniel, "Frozen Indices," U.S. Appl. No. 16/383,562, filed Apr. 12, 2019, Specification, Claims, Abstract, and Drawings, 50 pages.
Leskes, Boaz, "Cross Cluster Replication," U.S. Appl. No. 16/229,847, filed Dec. 21, 2018, Specification, Claims, Abstract, and Drawings, 53 pages.
Makwarth et al.," Distributed Tracing for Application Performance Monitoring," U.S. Appl. No. 16/381,997, filed Apr. 11, 2019, Specification, Claims, Abstract, and Drawings, 43 pages.
Kline, K., "SQL in a Nutshell", O'Reilly Media, Inc., Dec. 2000 [Retrieved on Jul. 28, 2020], Retrieved from the Internet: <https://learning.oreilly.com/library/view/sql-in-a/1565927443/>, 10 pages.
Bradford, Ronald, "SQL, ANSI Standards, PostgreSQL and MySQL", Retrieved from the Internet: <URL http://ronaldbradford.com/blog/sql-ansi-standards-postgresql-and-mysql-2015-03-26/, Mar. 26, 2015 [retrieved on Jun. 4, 2021], 33 pages.
"Can i use elasticsearch-sql to convert sql to DSL?", GitHub, Retrieved from the Internet: <URL https://github.com/NLPchina/elasticsearch-sql/issues/156>, Feb. 2016 [retrieved on Jul. 29, 2020], 4 pages.
Andhavarapu, Abhishek, "Beginners guide to querying Elasticsearch (Scoring vs Sorting)", Retrieved from the Internet <URL https://abhishek376.wordpress.com/2017/07/06/begginers-guide-to-querying-elasticsearch/, Jul. 6, 2017 [retrieved on Jun. 4, 2021], 10 pages.
"Extended European Search Report", European Patent Application No. 21165715.0, dated Dec. 10, 2020, 7 pages.
"Office Action", British Patent Application No. GB 2104443.3, dated Aug. 16, 2021, 9 pages.
"Office Action", British Patent Application No. GB2105205.5, dated Oct. 4, 2021, 11 pages.
"Extended European Search Report", European Patent Application No. 21167941.0, dated Sep. 6, 2021, 10 pages.

* cited by examiner

DATA SHIPPER AGENT MANAGEMENT AND CONFIGURATION SYSTEMS AND METHODS

CROSS-REFERENCE TO RELATED APPLICATION(S)

N/A

FIELD

The present disclosure is directed to systems and methods for managing and configuring data shipper agents. In some embodiments, specifically configured graphical user interfaces (GUI) are provided that allow users to configure data shipper agents through a modularized interface. Enrollment of data shipper agents and access to application programming interfaces (API) for receiving configurations can be accomplished using a secure token exchange in some embodiments.

SUMMARY

According to various embodiments, the present technology is directed to a method comprising: enrolling data shipper agents which are installed on edge nodes; providing the one or more GUIs that allow a user to configure the data shipper agents; receive selections of one or more tags for one of the data shipper agents from the one or more GUIs, each of the one or more tags representing one or more services assigned to the data shipper agents; receiving configurations for at least one of the services of the one of the data shipper agents through one of the one or more GUIs, the configurations of the services being modifiable through the one or more GUIs using a configuration application programming interface (API); and automatically reconfiguring configurations to other ones of the data shipper agents automatically.

According to various embodiments, the present technology is directed to a system comprising: at least one data shipper agent installed on at least one edge node, the at least one data shipper agent being configured to collect data from the at least one edge node and provide the same to a service provider system; an agent central management server configured to provide graphical user interfaces (GUI) that allow a user of the at least one data shipper agent to manage configurations for the at least data shipper one agent through a configuration application programming interface (API), wherein one or more of the GUIs allow the user to: enroll the at least one data shipper agent through a token exchange process; configure one or more tags for the at least one data shipper agent, each of the one or more tags being defined by one or more services provided by the least one data shipper agent, the one or more tags linking the one or more modules with the at least one data shipper agent.

According to various embodiments, the present technology is directed to a system comprising: data shipper agents installed on an edge node, wherein each of the data shipper agents are configured to collect data from the edge node and provide the same to a service provider system; an agent central management server configured to provide one or more graphical user interfaces (GUI) that allows a user of the data shipper agents to manage configurations for the data shipper agent, wherein the one or more GUIs allows the user to: enroll the data shipper agents; establish one or more tags for the data shipper agents, each of the one or more tags representing one or more services assigned to the data shipper agents, configurations of the services being modifiable through the one or more GUIs; receive configurations for at least one of the modules of one of the data shipper agents through one of the one or more GUIs; and automatically propagate the configurations to other ones of the data shipper agents automatically.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

The present disclosure relates generally to systems and methods that allow for the management and configuration of data shipper agents. In some embodiments, specifically configured graphical user interfaces (GUI) are provided that allow users to configure data shipper agents through a modularized interface. Enrollment of data shipper agents and access to application programming interfaces (API) can be accomplished using a secure token exchange in some embodiments.

In general, a data shipper agent is an object/service that is installed on an edge node of a network. In some instances, the data shipper agent is referred to as a beat or beats. The data shipper agent performs services at the edge node level and in some instances collects valuable data for use by a service provider system. More than one data shipper agent can be implemented on an edge node. Collectively, data shipper agents can transmit data from hundreds or thousands of machines and systems to service provider systems such as Logstash™ or Elasticsearch™ (e.g., components of the service provider system).

Data shipper agents reside on edge nodes, and in some embodiments with containers, or are deployed as functions. In some embodiments, data collected and assigned to the data shipper agents can be centralized in Elasticsearch™.

Data shipper agents can also ship collected data to Logstash™ for transformation and parsing.

To be sure, managing multiple data shipper agents is a complicated task, and central management as disclosed herein can be utilized to alleviate these problems by allowing data shipper agents to be configured by centrally using specifically configured GUIs and/or specifically configured API calls. Advantageously, the central management of data shipper agents allows for automatic reconfiguration of one or more data shipper agents on one or more edge nodes based on the configuration of one of the data shipper agents. That is, as configurations are modified for one data shipper agent, the resulting configuration changes can be used by the central management service to automatically reconfigure other data shipper agents. These and other aspects and advantages of the present disclosure are provided herein with reference to the collective drawings.

Figure 1:
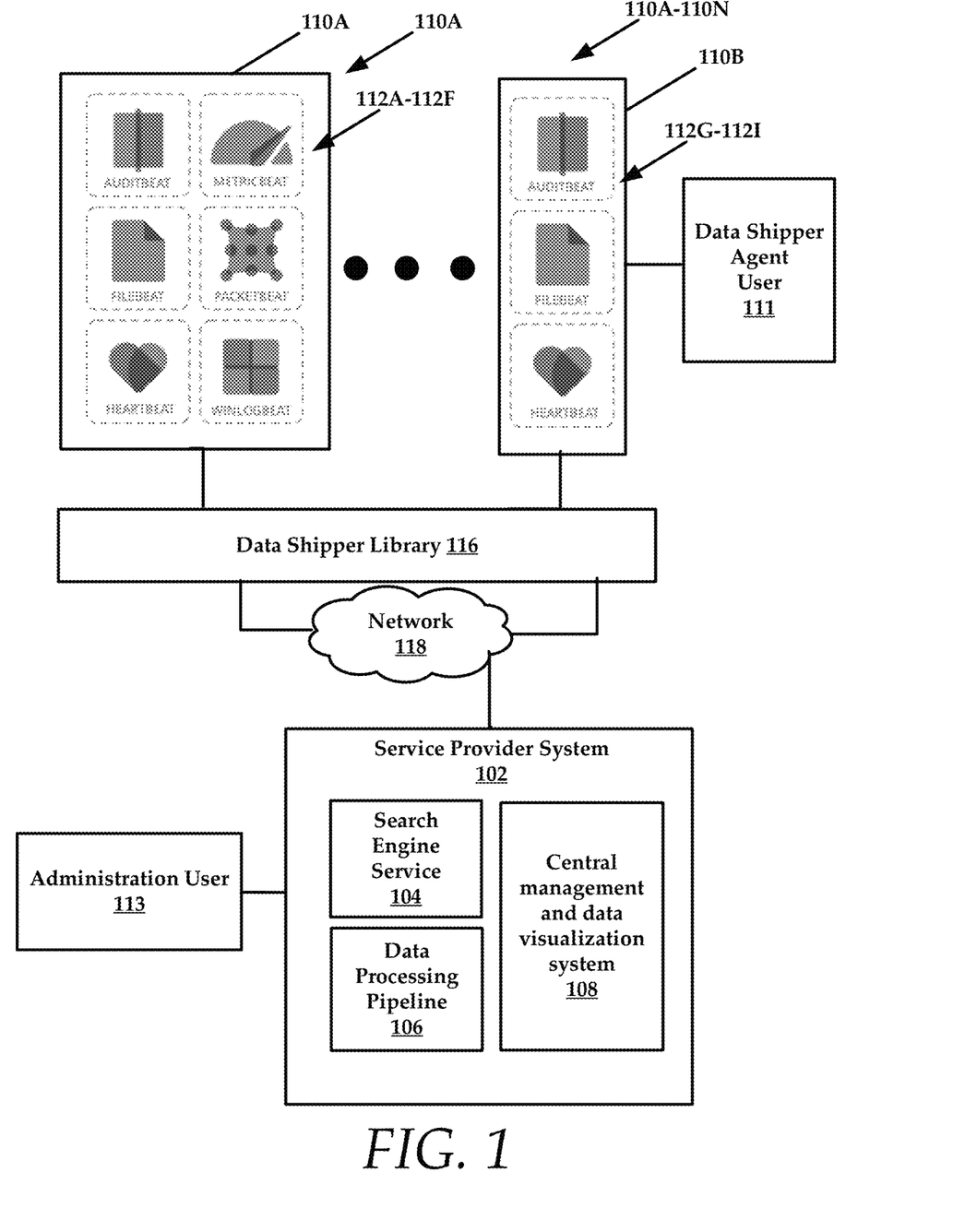
FIG. 1 is a schematic diagram of an example architecture constructed in accordance with the present disclosure.

FIG. 1 is an example schematic diagram of an architecture for practicing aspects or embodiments of the present disclosure. The architecture comprises a service provider system 102 that comprises a search engine service 104, a data processing pipeline 106, and a central management and data visualization system 108. In general, the service provider system 102 is configured to provide one or more services such as search engine or data visualization services based on data collected by data shipper agents of the present disclosure.

The architecture also comprises one or more edge nodes 110A-110N with one or more data shipper agents installed thereon. In one example, edge node 110A has data shipper agents 112A-112F installed thereon, while edge node 110B has data shipper agents 112G-112I installed thereon. Each edge node can have more than one data shipper agent installed thereon. Some edge nodes may comprise only one data shipper agent. In some instances the data shipper agents can be selected and assigned to edge nodes from a data shipper library 116.

In general, the data processing pipeline 106 ingests data from multiple sources such as the one or more data shipper agents simultaneously and transforms the collected data into a format that is utilizable by either the search engine service 104 and/or the data visualization system 108. Also, the components of the architecture can communicate through an example network 118 that can include any public and/or private network.

For context, the data shipper agents can each be configured to collect any one of a number of data types from the edge nodes. These data can include log file data, metric data, network data, event log data, audit data, uptime monitoring data, and/or serverless shipper data—just to name a few.

Generally, the central management and data visualization system 108 is configured to provide a means for central management and configuration of the data shipper agents. In various embodiments, the management and configuration are accomplished through one or more GUIs. In some embodiments, the GUIs allow for enrollment of data shipper agents and configuration of data shipper agents.

Figure 2A:
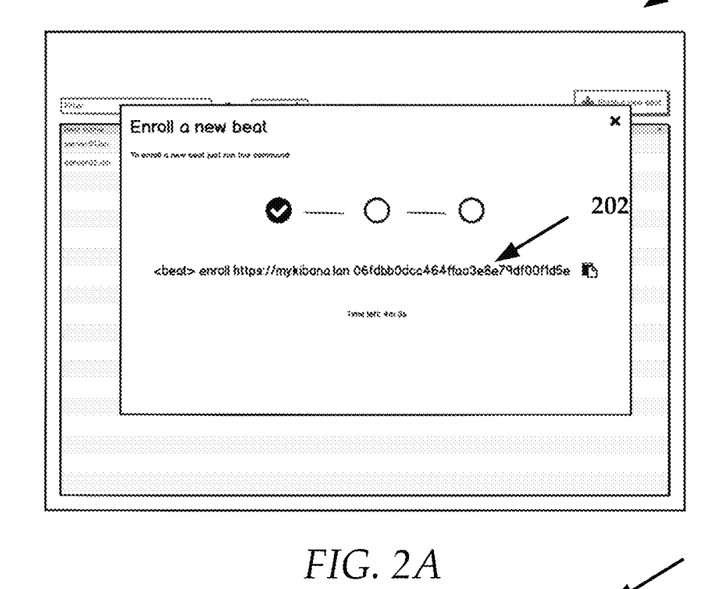
FIGS. 2A and 2B collectively illustrate GUIs for enrolling data shipper agents.

FIG. 2A is an example GUI 200 that allows a user to enroll a data shipper agent. The GUI 200 can provide the user with an executable command 202 that automatically enrolls the data shipper agent. This process enrolls a data shipper agent with the central management and data visualization system 108 which implements a central management API. Trust is then established between the data shipper agent and the central management and data visualization system 108. In some embodiments, trust is established through a secret token exchange process, as will be discussed in greater detail below. In some embodiments, after installation, the data shipper agent can communicate with the central management and data visualization system 108 through an API through a token exchange process (disclosed in greater detail infra). After this exchange, trust is established and an access token is created by the central management and data visualization system 108. The central management and data visualization system 108 provides this access token to the data shipper agent and the data shipper agent can utilize this access token for future calls to the central management and data visualization system 108.

Figure 2B:
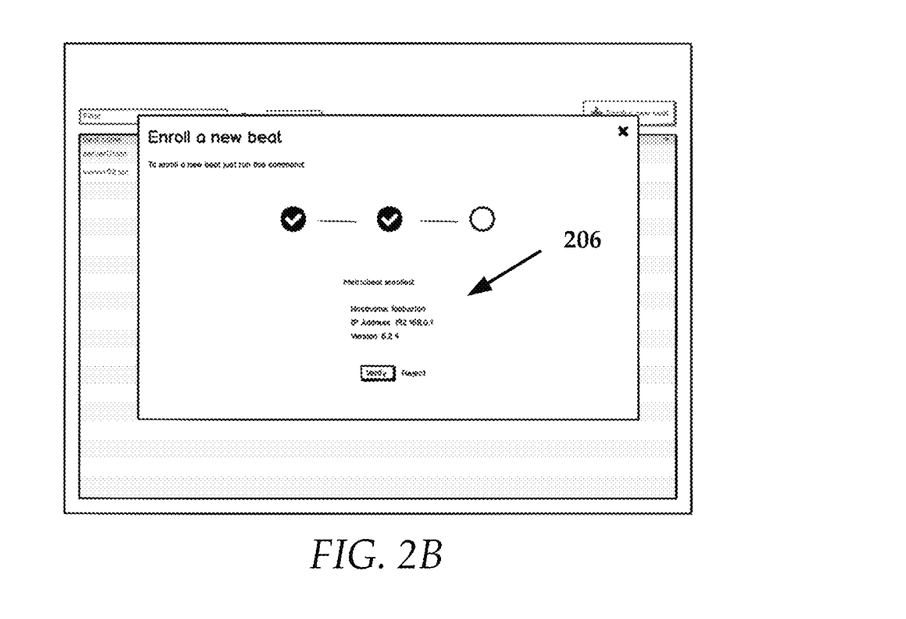

In FIG. 2B, the example GUI 200 illustrates successful enrollment of a data shipper agent. The GUI 200 displays parameters/attributes 206 of the data shipper agent such as a hostname, network address, and data shipper version for the data shipper agent. That is, the central management and data visualization system 108 (see FIG. 1) is configured to collect and display a hostname, network address, and data shipper version for the data shipper agent. In general, the hostname is an identifier that can identify both the data shipper agent and the edge node. In other embodiments, the hostname is an identifier that uniquely identifies only the data shipper agent. The data shipper version can be used to identify a version or revision of the data shipper agent. These data are useful when combining the data from multiple similar data shipper agents. When using the data produced by similar data shipper agents with different version numbers, such data may conflict in substance and in formatting. Thus, the version number allows the central management and data visualization system 108 to identify key characteristics about the data provided by the data shipper agents to avoid conflict or collisions in data when such data is combined or processed, for example, by the data processing pipeline 106. A user can reject or verify the parameters of the data shipper agent using buttons provided on the GUI 200. Also, generally speaking, the data processing pipeline 106 can be utilized to process data received from the data shipper agents for use in data visualization processes or search engaging services, for example.

Figure 3:
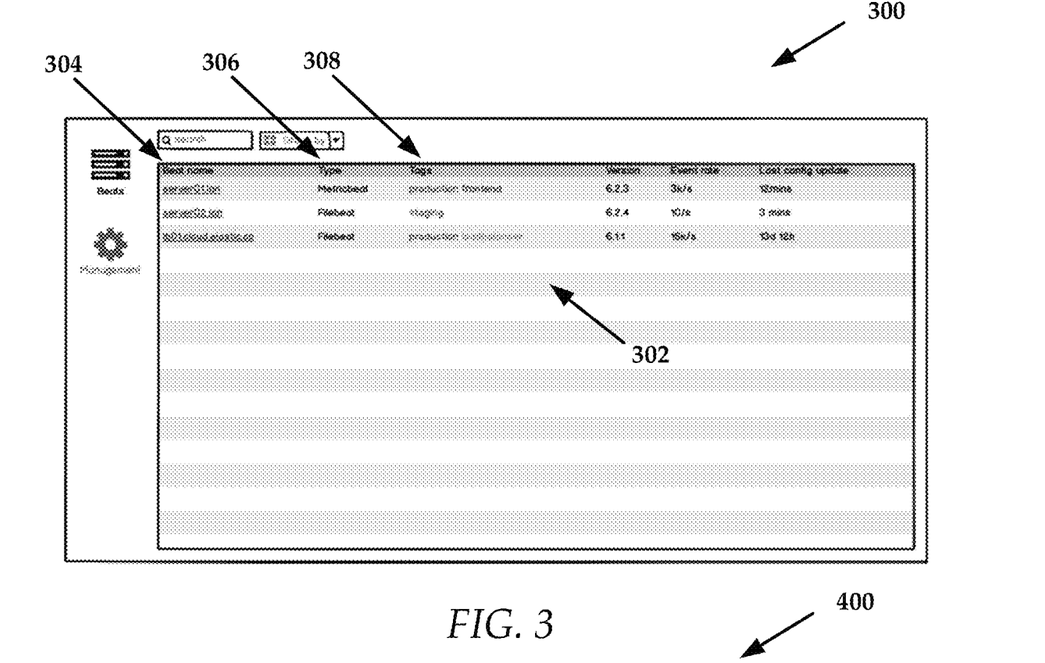
FIG. 3 is a GUI that illustrates a list of data shipper agents with corresponding parameters.

After enrollment, the central management and data visualization system 108 can be configured to provide a GUI, such as the GUI 300 of FIG. 3, which illustrates a list 302 of data shipper agents. In some embodiments, these data shipper agent could be installed on one or more edge nodes operated by an entity. The list 302 includes, in this example, three distinct data shipper agents names of server01.lan, server02.lan, and lbo1.cloud.elastic.co. These data shipper agents could correspond to different edge nodes, or could be installed on three distinct edge nodes belonging to the same entity.

The list 302 includes a plurality of columns, with each column being associated with a different data shipper agent parameter. For example, data shipper agent parameter of beat name (data shipper agent names) is provided in column 304. A data shipper agent parameter of type is provided in column 306, which is indicative of the type of data collected by the data shipper agent. A data shipper agent parameter of tags is provided in column 308, which is indicative of the type of tags incorporated into the data shipper agent. In general, a tag is related to or is indicative of a service or services provided by the data shipper agent. In general, tags can link one or more services with a data shipper agent. In this example, the server01.lan data shipper agent includes production and frontend services.

Figure 4:
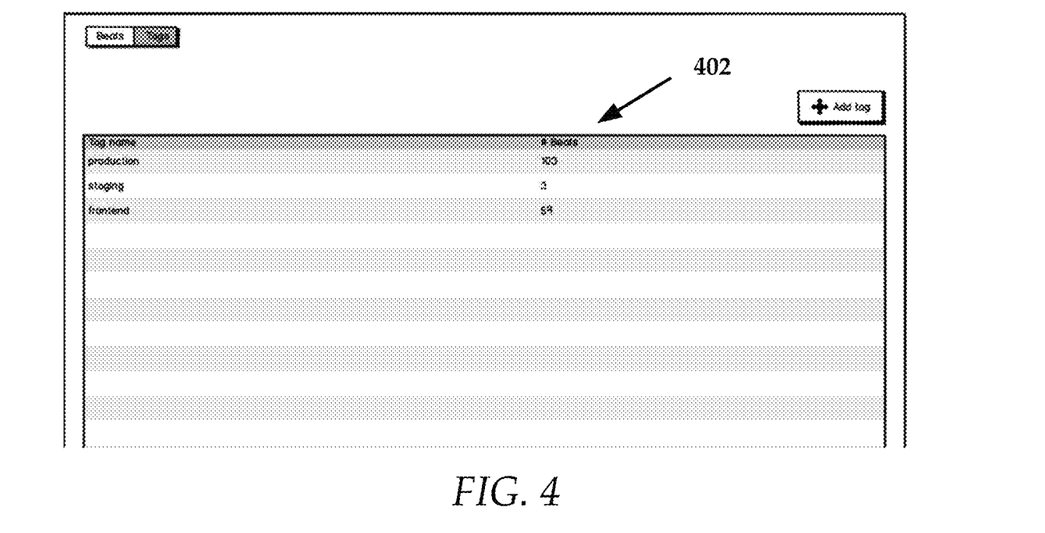
FIG. 4 is a GUI that illustrates attributes of a data shipper agent.

Columns are also provided for version number, event rates (how often data are collected by the data shipper agent), and a time for last configuration update for the data shipper agent. FIG. 4 illustrates a GUI 400 that provides a more detailed view of the parameters, and specifically tags, of a data shipper agent. For example, the data shipper agent includes three tags related to production, staging, and frontend. Each of these tags is indicative of one or more services and the tag names are general descriptions of data types that collected. Column 402 is provided that indicates how many instances of the data types for each tag have been collected.

Figure 5:
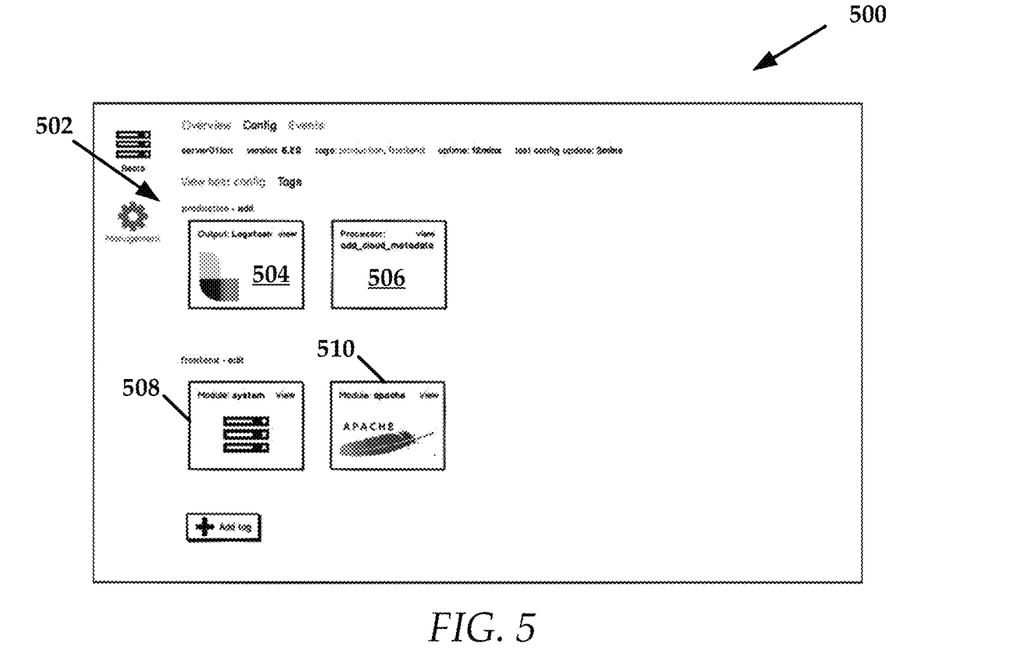
FIGS. 5-8 collectively provide a series of GUIs that allow a user to configure tags and services for data shipper agents.

FIG. 5 illustrates another GUI 500 that provides a configuration dashboard with the services for each tag. For example, GUI 500 currently illustrates services for a production tag 502. The production tag 502 in this example includes an output service 504 and processor service 506. The production tag in this example includes services for system module 508 and apache module 510. Each of these services provides a point for collecting and/or distributing collected data to one or more parts of the service provider system 102 (see FIG. 1).

Figure 6:
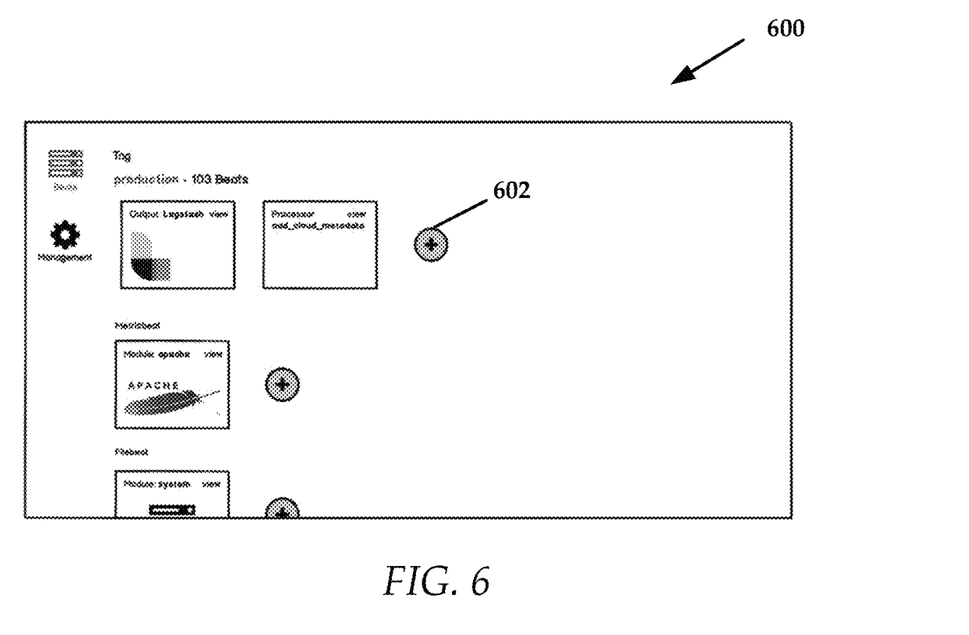
Figure 7:
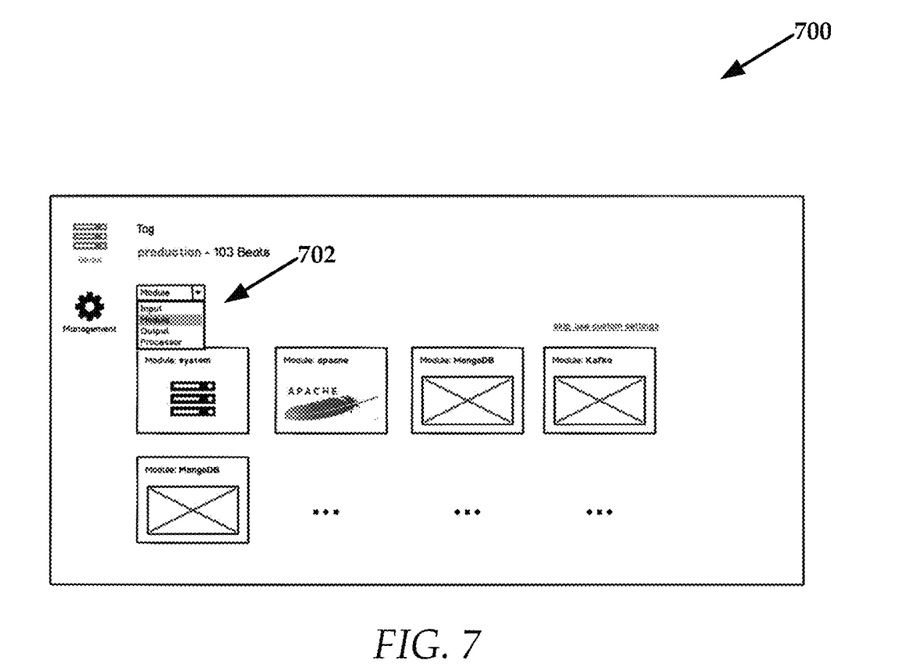

FIGS. 6 and 7 collectively illustrate the modification of configurations for the production tag 502 of FIG. 5. In more detail, a user can add a module to the production tag 502 by clicking the add button 602 of the GUI 600 of FIG. 6. These services are made available as selectable and configurable blocks.

To be sure, configuration objects are blocks of configuration data that a data shipper agent can understand and deploy. In some embodiments, these configuration objects are unstructured YAML (human-readable data serialization language) objects, with some well-known names. Each object type can be either a list or a unique configuration. List sets can be combined, which means that several configurations can be merged in a single list. Unique configurations may not be combined.

This calls the GUI 700 of FIG. 7 to be displayed in response. The user can select from a dropdown menu 702 that includes service types such as input, module, output, and processor service types. In general, the dropdown menu 702 is configured to allow a user to select one or more service types so as to define the one or more services.

Figure 8:
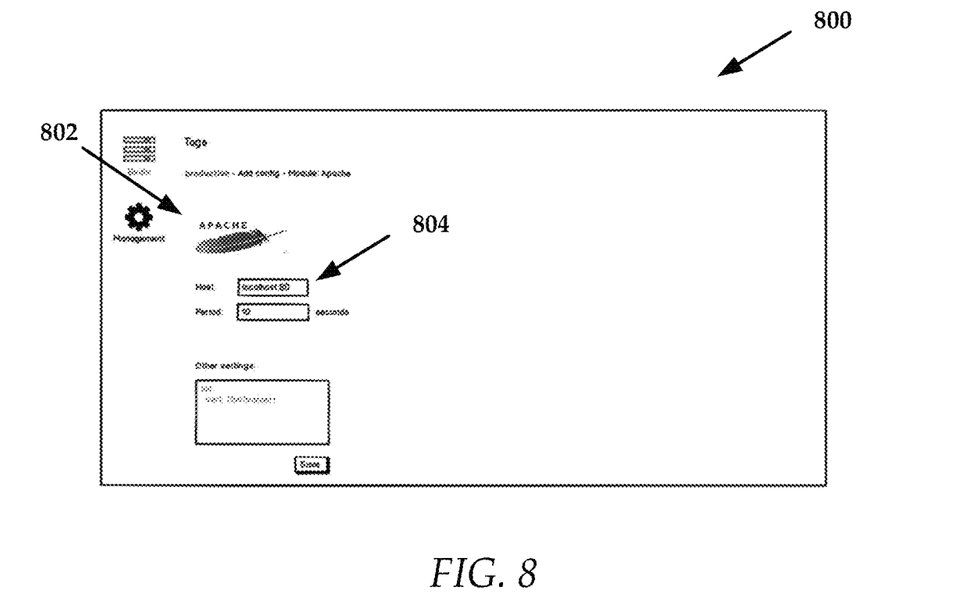

When a service type is selected, the GUI 800 of FIG. 8 is displayed in response. In FIG. 8, an apache service 802 is configured according to form fields 804, which are completed by the user to define attributes of the service. In this example, the user specifies the host address for an apache server and period for which data is collected from the apache server.

In sum, FIGS. 5-8 illustrate a process for allowing a user to select one or more tags and add one or more services using configurable blocks made available by the selection of the one or more tags. To be sure, the configurable blocks comprise any of inputs, modules, outputs, or processors service types as noted above. The specific details of the inputs, modules, outputs, or processors are received as illustrated in FIG. 8.

As noted above, in some instances conflicts between data shipper agents may occur. Conflicts may occur when a data shipper agent belongs to two tags that contain a unique object of the same type, for instance, two tags configuring an output for an edge node for the same data shipper agent. In some embodiments, the GUI is configured to detect and display this situation, to ensure the user understands what is occurring.

In some embodiments, events related to the data shipper agents such as configuration changes, data collection events, and other similar data can be tracked and provided in a report to the central management and data visualization system 108. These data can assist a user or the central management and data visualization system 108 in identifying version changes and errors with configuration updates between the data shipper agents. In some embodiments, configuration changes to data shipper agents can be performed by a user on the central management and data visualization system 108. In another embodiment, configuration changes to data shipper agents can be performed by a user associated with the edge node. A manager is enabled to change all of (or part of) a configuration file for a data shipper agent and restart the data shipper agent, or allow the data shipper agent to change a limited set of settings during run-time, without the need of full restarts.

Figure 9:
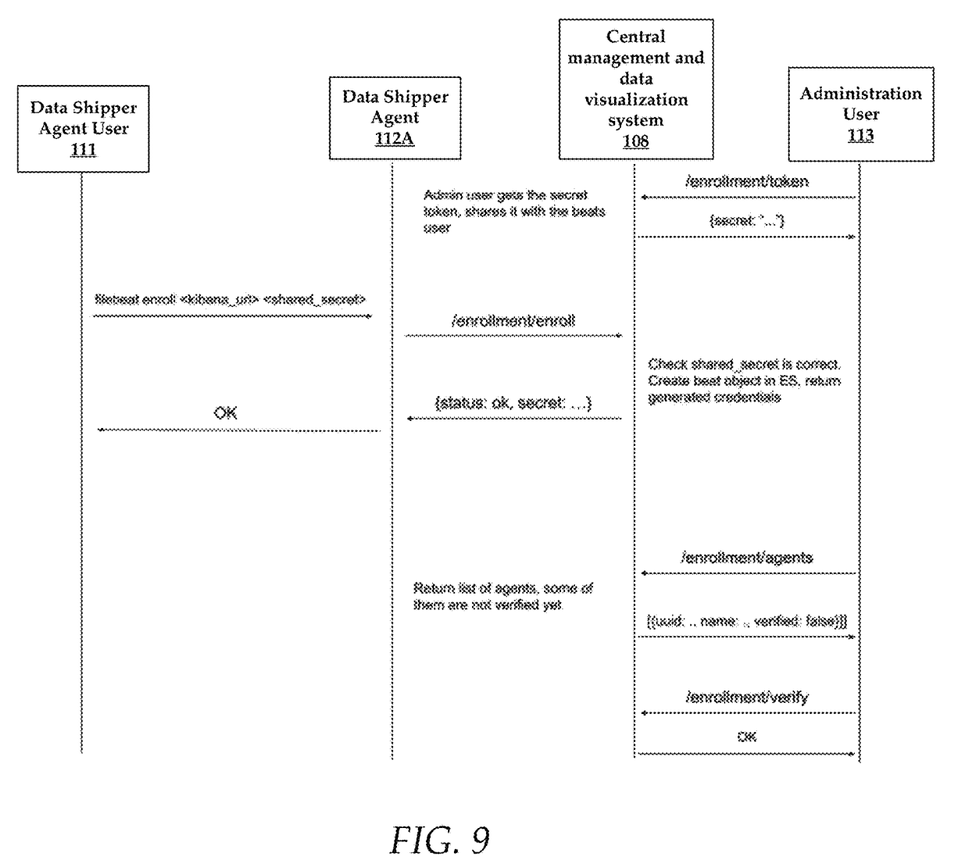
FIG. 9 is a signal flow diagram of an example token exchange enrollment process.

Referring now to FIG. 9, in some embodiments, enrollment is the process of establishing mutual trust between a data shipper agent and the central management and data visualization system 108 (see FIG. 1). Enrollment generally precedes the data shipper agent being enabled to fetch configurations from the central management and data visualization system 108.

In some embodiments, an administrator can confirm or verify the enrolled agents before the enrolled data shipper agent can fetch configurations from the central management and data visualization system 108 and/or push collected data to the search engine service 104 and/or the data processing pipeline 106 (also see FIG. 1). As noted above, the enrollment process can be streamlined using a general enrollment command such as filebeat enroll <kibana_url> [shared secret]. In this example, a filebeat type of data shipper agent is enrolled and specifies a hostname URL "kibana_url". A shared secret is appended to the general enrollment command. In some embodiments, the enrollment process is initiated by a data shipper agent user 111.

The shared secret could include a token provided by an administration user. The shared secret token can be generated using any desired hashing or encryption function such as AES256 (advanced encryption standard). This shared secret token can be provided to an administration user 113 who in turn provides the share secret token to the data shipper agent user 111.

The data input into the encryption function can be randomly generated or selected by the central management and data visualization system 108. In some embodiments, the shared secret token is uniformly used across all data shipper agents. In other embodiments, the shared secret is unique for each data shipper agent, or a group of data shipper agents.

When manually enrolling a data shipper agent, the shared secret token is made available to read by the central management and data visualization system 108 through a GUI. The shared secret token can be generated on bootstrap, available from token API provided by the central management and data visualization system 108. In some embodiments, the shared secret token is provided on a GUI provided by the central management and data visualization system 108. Next, the data shipper agent that has been installed on the edge node can request enrollment by the central management and data visualization system 108 using the shared secret. It will be understood that in some embodiments, rather than using a shared secret token a whitelist. For example, the data shipper agent can be enrolled if included on an IP whitelist. That is, the central management and data visualization system 108 maintains whitelists of IP addresses of edge nodes. These edge nodes are authorized such that any data shipper agent specifying an IP address included in the whitelist is automatically enrolled without token exchange.

When the central management and data visualization system 108 receives the shared secret token, the central management and data visualization system 108 can then create an object for the data shipper agent. Initially, the central management and data visualization system 108 marks this object as being unverified. This object can be created, for example at the search engine service 104 (see FIG. 1). In various embodiments, objects created for the search engine service 104 are tracked using a central management index. Each object can be associated with a unique user identifier.

The central management and data visualization system 108 transmits credentials to the data shipper agent and the central management and data visualization system 108 stores the credentials in a keystore (a keystore can also be maintained on the data shipper agent as well). It will be understood that the data shipper agent still does not have access to the configuration API provided by the central management and data visualization system 108.

The central management and data visualization system 108 can check for newly enrolled data shipper agents and verify the enrolled data shipper agents. Once verified, access to configurations stored on the central management and data visualization system 108 is granted to the data shipper agent. The data shipper agent can access configurations through the configuration API using the stored credentials provided by the central management and data visualization system 108.

As noted above, in some embodiments, the enrollment and configuration access processes are entirely automated by the central management and data visualization system 108. For example, the central management and data visualization system 108 deploys a script comprising credentials for a user of the central management and data visualization system 108. The central management and data visualization system 108 then retrieves a shared secret from a token API. The central management and data visualization system 108 deploys a data shipper agent and runs the data shipper agent enrollment command and passes the secret shared token. The central management and data visualization system 108 creates an object for the data shipper agent and identifies the data shipper agent as not verified. Credentials for the data shipper agent are returned to the data shipper agent, which stores them in a keystore. To be sure, at this point in the process the data shipper agent cannot access the configuration API. The deployment script obtains a unique user identifier for the data shipper agent and calls a verify API implemented by the central management and data visualization system 108 to verify the data shipper agent.

In some embodiments an audit log is generated for authentication related events, and the same can be performed for enrollment and verification. These log related events can be stored in a file on the central management and data visualization system 108, ideally using a similar format as audit log file being used by the search engine service 104.

Figure 10:
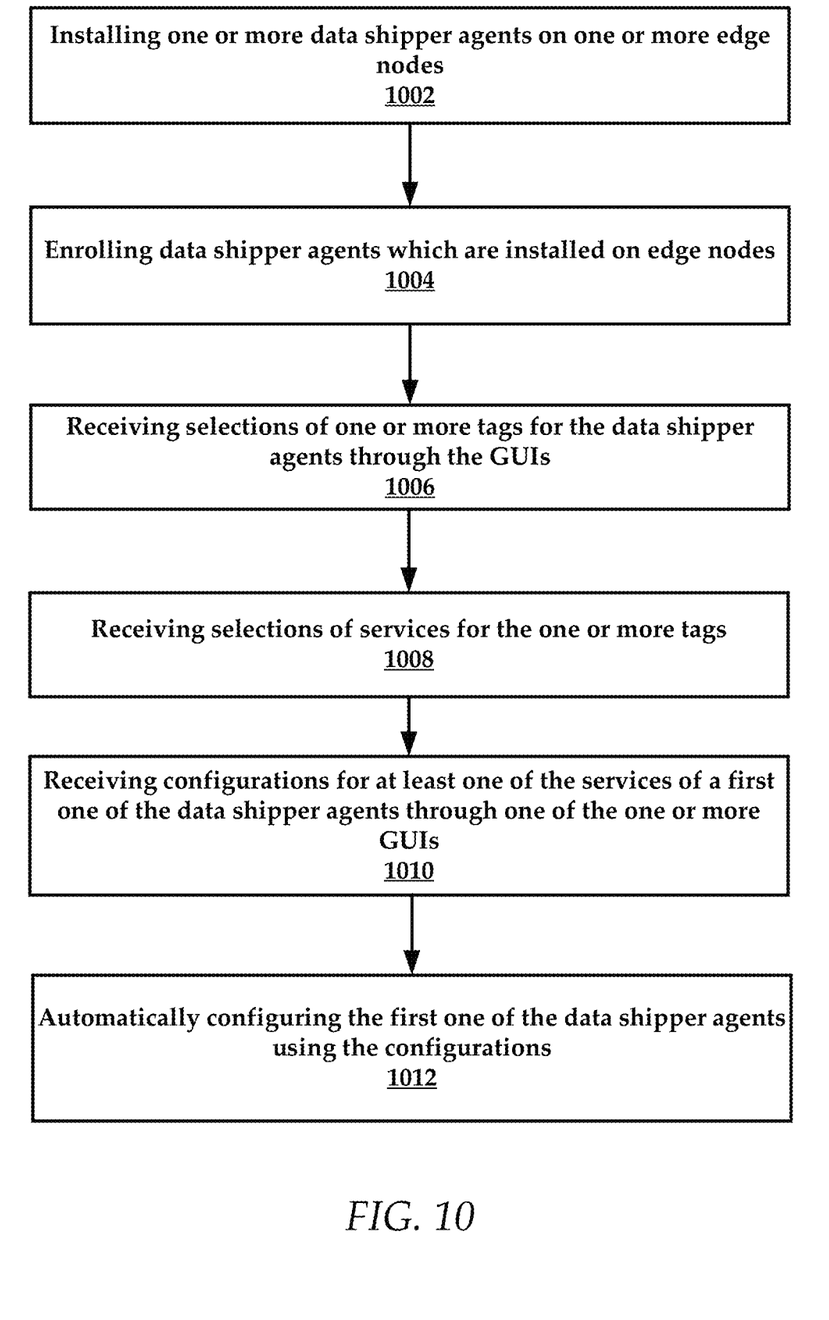
FIG. 10 is a flowchart of an example method of the present disclosure.

FIG. 10 is a flowchart of an example method that can be performed in accordance with the present disclosure. The method includes a step 1002 of installing one or more data shipper agents on one or more edge nodes. After installation, the method includes a step 1004 of enrolling data shipper agents which are installed on edge nodes. Again, this process can include the token exchange and verification processes disclosed above. After the data shipper agents are enrolled, configurations can be pushed down to the data shipper agents.

In various embodiments, the configurations for the data shipper agents are created by users. Thus, in some instances, the method further includes a step 1006 of providing the one or more GUIs, which can be utilized by a user to establish configurations for data shipper agents as disclosed herein.

In some embodiments, the method includes a step 1006 of receiving selections of one or more tags for the data shipper agents through the GUIs. To be sure, each of the one or more tags may be defined by services assigned to the data shipper agents by a user. Thus, the method includes a step 1008 of receiving selections of services which can be linked to the one or more tags. As noted above, these could include input, output, frontend, and other similar service types.

The method includes a step 1010 of receiving configurations for at least one of the services of a first one of the data shipper agents through one of the one or more GUIs. To be sure configurations of the services are modifiable through the one or more GUIs using a configuration application programming interface (API). The configurations can be pushed to the first one of the data shipper agents using the configuration APIs as well. Next, the method includes a step 1012 of automatically configuring the first one of the data shipper agents using the configurations. That is, the data shipper agents can receive and implement the configurations without user intervention. Once the configurations to the first one of the data shipper agents has occurred, the configurations can be pushed to other similar data shipper agents installed on the same or other edge nodes. In some embodiments, the method includes automatically reconfiguring configurations to other ones of the data shipper agents automatically using the configurations selected for the first one of the data shipper agents. This reconfiguration includes changes to settings for services and/or tags of the additional data shipper agents.

Figure 11:
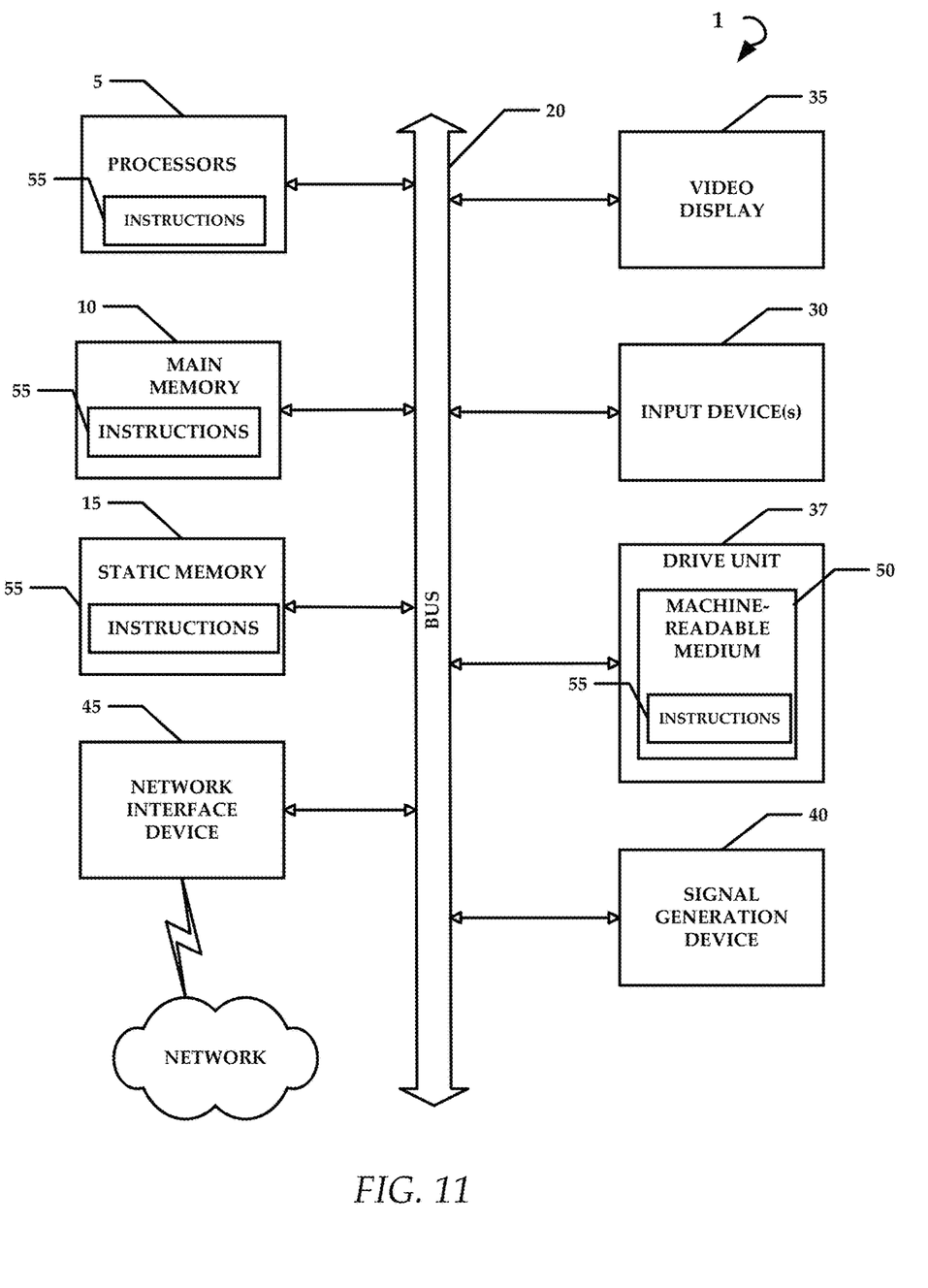
FIG. 11 is a schematic diagram of an example computer device that can be utilized to implement aspects of the present technology.

FIG. 11 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be, for example, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within static memory 15 and/or within the processors 5 during execution thereof by the computer system 1. The main memory 10, static memory 15, and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, section, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A system, comprising:
    at least one data shipper agent installed on at least one edge node, the at least one data shipper agent being configured to collect data from the at least one edge node and provide the data to a service provider system; and
    an agent central management server configured to provide one or more graphical user interfaces (GUIs) that allow a user of the at least one data shipper agent to manage configurations for the at least one data shipper agent through a configuration application programming interface (API), wherein the one or more GUIs allow the user to:
        enroll the at least one data shipper agent through a token exchange process;
        configure one or more tags for the at least one data shipper agent, each of the one or more tags being defined by one or more services provided by the at least one data shipper agent, the one or more tags linking the one or more services with the at least one data shipper agent, the configuration comprising:
            selecting the one or more tags;
            adding the one or more services to the selected one or more tags, using configurable and selectable blocks made available by the selection of the one or more tags, the configurable and selectable blocks including one or more service types, the one or more service types comprising any inputs, modules, outputs, or processors; and
            defining attributes of the one or more services, according to form fields, the form fields to be completed by the user to indicate at least one of a host address and a time period for which data is collected from a host; and
        check for a presence of a conflict between a first tag and a second tag of the one or more tags by establishing that the first tag and the second tag represent the same service assigned to the same data shipper agent of data shipper agents.

2. The system according to claim 1, wherein the data collected by the at least one data shipper agent comprises at least one of log file data, metric data, network data, event log data, audit data, uptime monitoring data, or serverless shipper data.

3. The system according to claim 1, wherein during enrollment the one or more GUIs is configured to collect and display a hostname, network address, and data shipper version for the at least one data shipper agent.

4. The system according to claim 3, wherein the one or more GUIs is configured to display a list comprising the at least one data shipper agent along with parameters of the at least one data shipper agent comprising at least one of a data shipper agent name, a data shipper agent type, a name for the one or more tags, the data shipper version, an event rate, or a last configuration update time.

5. The system according to claim 1, wherein the one or more GUIs is configured to allow the user to select the one or more service types by using the configurable and selectable blocks so as to define the one or more services.

6. The system according to claim 1, wherein the one or more GUIs is configured to provide a configuration dashboard with the one or more services for each tag.

7. The system according to claim 1, wherein each of the one or more services provides a point for collecting data or distributing collected data to the service provider system.

8. The system according to claim 1, wherein the token exchange process comprises the agent central management server being further configured to:
provide a secret token to the at least one data shipper agent;
establish an object for the at least one data shipper agent that is unverified and unable to access the configuration API;
receive the secret token from the at least one data shipper agent;
verify the secret token; and
allow the at least one data shipper agent to utilize the configuration API.

9. The system according to claim 1, further comprising the service provider system, the service provider system being configured to provide one or more service provider system services using the data of the at least one data shipper agent.

10. The system according to claim 1, wherein the user assigns the one or more services to the at least one data shipper agent by making selections through the one or more GUIs of the one or more tags for the at least one data shipper agent, the one or more tags being defined by the one or more services.

11. A system, comprising:
data shipper agents installed on an edge node, wherein each of the data shipper agents is configured to collect data from the edge node and provide the data to a service provider system; and
an agent central management server configured to provide one or more graphical user interfaces (GUIs) that allows a user of the data shipper agents to manage configurations for the data shipper agents, wherein the one or more GUIs allows the user to:
enroll the data shipper agents;
establish one or more tags for the data shipper agents, each of the one or more tags representing one or more services assigned to the data shipper agents, configurations of the one or more services being modifiable through the one or more GUIs;
receive configurations for at least one of the one or more services of one of the data shipper agents through one of the one or more GUIs, the configurations being based on:
selection of the one or more tags;
addition of the one or more services to the selected one or more tags, using configurable and selectable blocks made available by the selection of the one or more tags, the configurable and selectable blocks including one or more service types, the one or more service types comprising any inputs, modules, outputs, or processors; and
definition of attributes of the one or more services, according to form fields, the form fields to be completed by the user to indicate at least one of a host address and a time period for which data is collected from a host; and
check for a presence of a conflict between a first tag and a second tag of the one or more tags by establishing that the first tag and the second tag represent the same service assigned to the same data shipper agent of the data shipper agents;
automatically propagate the configurations to other ones of the data shipper agents.

12. The system according to claim 11, wherein during enrollment, the one or more GUIs is configured to collect and display a hostname, network address, and data shipper version for the data shipper agents.

13. The system according to claim 12, wherein at least one of the one or more GUIs is configured to display a list comprising the data shipper agents along with parameters of the data shipper agents, wherein the parameters comprise at least one of a data shipper agent name, a data shipper agent type, a name for the one or more tags, the data shipper version, an event rate, or a last configuration update time.

14. The system according to claim 11, wherein the one or more GUIs is configured to allow the user to select the one or more service types by using the configurable and selectable blocks so as to define the one or more services.

15. The system according to claim 11, wherein at least one of the one or more GUIs is configured to provide a configuration dashboard with the one or more services for each tag.

16. The system according to claim 11, wherein each of the one or more services provides a point for collecting data or distributing collected data to the service provider system.

17. A method, comprising:
enrolling data shipper agents which are installed on edge nodes;
providing one or more graphical user interfaces (GUIs) that allow a user to configure the data shipper agents;
receiving selections of one or more tags for one of the data shipper agents from the one or more GUIs, each of the one or more tags representing one or more services assigned to the data shipper agents;
receiving configurations for at least one of the one or more services of the one of the data shipper agents through one of the one or more GUIs, the configurations of the one or more services being modifiable through the one or more GUIs using a configuration application programming interface (API), the configurations being based on:
the selections of the one or more tags;
addition of the one or more services to the selected one or more tags, using configurable and selectable blocks made available by the selections of the one or more tags, the configurable and selectable blocks including one or more service types, the one or more service types comprising any inputs, modules, outputs, or processors; and
definition of attributes of the one or more services, according to form fields, the form fields to be completed by the user to indicate at least one of a host address and a time period for which data is collected from a host; and
checking for a presence of a conflict between a first tag and a second tag of the one or more tags by establishing that the first tag and the second tag represent the same service assigned to the same data shipper agent of the data shipper agents;
automatically reconfiguring the configurations to other ones of the data shipper agents.

18. The method according to claim 17, further comprising collecting and displaying a hostname, network address, and data shipper version for the data shipper agents.

19. The method according to claim 18, further comprising displaying a list comprising the data shipper agents along with parameters of the data shipper agents, wherein the parameters comprise at least one of a data shipper agent name, a data shipper agent type, a name for the one or more tags, the data shipper version, an event rate, or a last configuration update time.

20. The method according to claim 19, further comprising:
   providing a secret token to the data shipper agents;
   establishing an object for each of the data shipper agents that is unverified and unable to access the configuration API;
   receiving the secret token from the data shipper agents;
   verifying the secret token; and
   allowing the data shipper agents to utilize the configuration API based on the verification.

* * * * *